(12) United States Patent
Bertrand et al.

(10) Patent No.: US 10,652,003 B2
(45) Date of Patent: May 12, 2020

(54) HARQ DESIGN FOR HIGH PERFORMANCE WIRELESS BACKHAUL

(71) Applicant: TEXAS INSTRUMENTS INCORPORATED, Dallas, TX (US)

(72) Inventors: Pierre Bertrand, Antibes (FR); June Chul Roh, Allen, TX (US); Jun Yao, Shanghai (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 57 days.

(21) Appl. No.: 14/876,690

(22) Filed: Oct. 6, 2015

(65) Prior Publication Data

US 2016/0218849 A1   Jul. 28, 2016

Related U.S. Application Data

(60) Provisional application No. 62/106,604, filed on Jan. 22, 2015.

(51) Int. Cl.
| | |
|---|---|
| *H04L 5/00* | (2006.01) |
| *H04L 5/14* | (2006.01) |
| *H04L 1/16* | (2006.01) |
| *H04L 1/18* | (2006.01) |
| *H04L 1/00* | (2006.01) |

(52) U.S. Cl.
CPC .......... *H04L 5/0055* (2013.01); *H04L 1/1607* (2013.01); *H04L 1/1621* (2013.01); *H04L 1/1896* (2013.01); *H04L 5/14* (2013.01); *H04L 5/001* (2013.01); *H04L 5/1469* (2013.01); *H04L 2001/0093* (2013.01); *H04L 2001/0097* (2013.01)

(58) Field of Classification Search
None
See application file for complete search history.

(56) References Cited

U.S. PATENT DOCUMENTS

| | | | |
|---|---|---|---|
| 2003/0125051 A1 | 7/2003 | Leppisaari | |
| 2009/0168731 A1 | 7/2009 | Zhang et al. | |
| 2009/0213769 A1* | 8/2009 | Shen | H04W 72/14 370/280 |

(Continued)

FOREIGN PATENT DOCUMENTS

| | | |
|---|---|---|
| CN | 1969475 A | 5/2007 |
| CN | 101771515 A | 7/2010 |

(Continued)

OTHER PUBLICATIONS

Supplementary European Patent Office Search Report, Application No. 16740880.6, 13 pages.

(Continued)

*Primary Examiner* — Mohammad S Adhami
(74) *Attorney, Agent, or Firm* — Gregory J. Albin; Charles A. Brill; Frank D. Cimino

(57) ABSTRACT

A method of operating a wireless communication system is disclosed. The method includes receiving respective downlink transmissions at N second transceivers from a first transceiver, where N is a positive integer greater than 1. The reception acknowledgement signals by the N second transceivers are combined into a single reception acknowledgement signal and transmitted to the first transceiver.

20 Claims, 9 Drawing Sheets

(56) References Cited

U.S. PATENT DOCUMENTS

| | | | |
|---|---|---|---|
| 2009/0241004 A1* | 9/2009 | Ahn | H04L 1/1812 714/749 |
| 2011/0110262 A1 | 5/2011 | Yu et al. | |
| 2011/0223924 A1* | 9/2011 | Lohr | H04W 72/042 455/450 |
| 2011/0267991 A1* | 11/2011 | Damnjanovic | H04L 1/1607 370/279 |
| 2012/0002591 A1* | 1/2012 | Noh | H04B 7/15557 370/315 |
| 2012/0076023 A1* | 3/2012 | Ko | H04B 7/0486 370/252 |
| 2012/0213095 A1* | 8/2012 | Krishnamurthy | H04L 5/001 370/252 |
| 2013/0279480 A1 | 10/2013 | Park et al. | |
| 2013/0343299 A1 | 12/2013 | Sayana et al. | |
| 2014/0328292 A1 | 11/2014 | Yang et al. | |
| 2015/0271810 A1* | 9/2015 | Sartori | H04L 5/14 370/280 |
| 2015/0296509 A1* | 10/2015 | Yang | H04B 7/26 370/280 |
| 2018/0270634 A1* | 9/2018 | Kim | H04L 5/00 |

FOREIGN PATENT DOCUMENTS

| | | |
|---|---|---|
| CN | 102150467 A | 8/2011 |
| JP | 2011527536 A | 10/2011 |
| WO | WO2010071334 A2 | 6/2010 |
| WO | 2011140133 A1 | 11/2011 |
| WO | WO2014014254 A1 | 1/2014 |

OTHER PUBLICATIONS

Chinese Office Action dated Nov. 27, 2019, Chinese Application No. 201680006734.8, 18 pages.

\* cited by examiner

| UL-DL CONFIGURATIONS | | | | | | | | | | | |
|---|---|---|---|---|---|---|---|---|---|---|---|
| UL-DL CONFIGURATION | SLOT NUMBER IN 5ms-FRAME | | | | | | | | | | |
| | 0 | 1 | 2 | 3 | 4 | 5 | 6 | 7 | 8 | 9 | |
| 0 | U | D | D | S | U | U | U | U | U | U | |
| 1 | D | D | D | S | U | U | U | U | U | U | |
| 2 | D | D | D | S | U | U | U | U | U | U | |
| 3 | D | D | D | S | U | U | U | U | U | U | |
| 4 | D | D | D | S | U | U | U | D | D | D | |
| 5 | D | D | D | S | U | U | D | D | D | D | |
| 6 | D | D | D | S | U | U | U | D | D | D | |

D - DOWNLINK (DL) SLOT
U - UPLINK (UL) SLOT
S - SPECIAL SLOT

FIG. 2

TD-LTE FRAME CONFIGURATIONS (WITH 5ms UL/DL PERIODICITY)

| UL-DL CONFIGURATION | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | D | D | DwPTS | UpPTS | U | U | U | U | U | U | D | D | DwPTS | UpPTS | U | U | U | U | U | U |
| 1 | D | D | DwPTS | UpPTS | U | U | U | U | D | D | D | D | DwPTS | UpPTS | U | U | U | U | D | D |
| 2 | D | D | DwPTS | UpPTS | U | U | D | D | D | D | D | D | DwPTS | UpPTS | U | U | D | D | D | D |

SLOT NUMBER IN 10 ms FRAME

FIG. 3
(PRIOR ART)

COEXISTING NLOS FRAME CONFIGURATIONS

| UL-DL CONFIGURATION | 0 | 1 | 2 | 3 | 4 | 5 | 6 | 7 | 8 | 9 |
|---|---|---|---|---|---|---|---|---|---|---|
| 5ms #1 | D | D | D | S | U | U | U | U | U | U |
| 5ms #3 | D | D | D | S | U | U | U | D | D | D |
| 5ms #5 | D | D | D | S | U | D | D | D | D | D |

SLOT NUMBER IN 5 ms FRAME

| CC | SPS/DYN | TRANSMISSION#/SLOT# | 1 | 2 | 3 | 4 | 5 | 6 | 7 | 8 | 9 | 0 | 1 | 2 | 3 | 4 |
|---|---|---|---|---|---|---|---|---|---|---|---|---|---|---|---|---|
| 3 (SECONDARY) | DYNAMIC | 0 | 1 | 2 | 3 | | 4 | 0 | 1 | 2 | 3 | 0 | | | | |
| 2 (SECONDARY) | DYNAMIC | 1 | 0 | 1 | 2 | | 3 | 4 | 0 | 1 | 2 | 4 | | | | |
| 1 (SECONDARY) | DYNAMIC | 2 | 4 | 0 | 1 | | 2 | 3 | 4 | 0 | 1 | 3 | | | | |
| 0 (PRIMARY) | DYNAMIC | 3 | 3 | 4 | 0 | | 1 | 2 | 3 | 4 | 0 | 2 | | | | |
| 0 (PRIMARY) | SPS #3 | 4 | 2 | 3 | 4 | | 0 | 1 | 2 | 3 | 4 | 1 | | | | |
| 0 (PRIMARY) | SPS #2 | 5 | 1 | 2 | 3 | | 4 | 0 | 1 | 2 | 3 | 0 | | | | |
| 0 (PRIMARY) | SPS #1 | 6 | 0 | 1 | 2 | | 3 | 4 | 0 | 1 | 2 | 4 | | | | |
| 0 (PRIMARY) | SPS #0 | 7 | 4 | 0 | 1 | | 2 | 3 | 4 | 0 | 1 | 3 | | | | |

HARQ DESIGN FOR HIGH PERFORMANCE WIRELESS BACKHAUL

This application claims the benefit under 35 U.S.C. § 119(e) of Provisional Appl. No. 62/106,604, filed Jan. 22, 2015 (TI-75798PS), which is incorporated herein by reference in its entirety.

BACKGROUND OF THE INVENTION

Embodiments of the present invention relate to wireless communication systems and, more particularly, to low overhead control signaling of a Non-Line-Of-Sight (NLOS) wireless communication system compatible with a time-division duplex long term evolution (TD-LTE) Radio Access Network (RAN).

A key answer to the huge data demand increase in cellular networks is the deployment of small cells providing Long Term Evolution (LTE) connectivity to a smaller number of users than the number of users typically served by a macro cell. This allows both providing larger transmission/reception resource opportunities to users as well as offloading the macro network. However, although the technical challenges of the Radio Access Network (RAN) of small cells have been the focus of considerable standardization effort through 3GPP releases 10-12, little attention was given to the backhaul counterpart. It is a difficult technological challenge, especially for outdoor small cell deployment where wired backhaul is usually not available. This is often due to the non-conventional locations of small cell sites such as lamp posts, road signs, bus shelters, etc., in which case wireless backhaul is the most practical solution.

The LTE wireless access technology, also known as Evolved Universal Terrestrial Radio Access Network (E-UTRAN), was standardized by the 3GPP working groups. OFDMA and SC-FDMA (single carrier FDMA) access schemes were chosen for the DL and UL of E-UTRAN, respectively. User equipments (UEs) are time and frequency multiplexed on a physical uplink shared channel (PUSCH) and a physical uplink control channel (PUCCH), and time and frequency synchronization between UEs guarantees optimal intra-cell orthogonality. The LTE air-interface provides the best spectral-efficiency and cost trade-off of recent cellular networks standards, and as such, has been vastly adopted by operators as the unique 4G technology for the Radio Access Network (RAN), making it a robust and proven technology. As the tendency in the RAN topology is to increase the cell density by adding small cells in the vicinity of a legacy macro cells, the associated backhaul link density increases accordingly and the difference between RAN and backhaul wireless channels also decreases. This also calls for a point-to-multipoint (P2MP) backhaul topology. As a result, conventional wireless backhaul systems typically employing single carrier waveforms with time-domain equalization (TDE) techniques at the receiver become less practical in these environments. This is primarily due to their limitation of operating in point-to-point line-of-sight (LOS) channels in the 6-42 GHz microwave frequency band. On the contrary, the similarities between the small cell backhaul and small cell access topologies (P2MP) and wireless radio channel (NLOS) naturally lead to use a very similar air interface.

There are several special issues associated with NLOS backhaul links at small cell sites, such as a requirement for high reliability with a packet error rate (PER) of $10^{-6}$, sparse spectrum availability, critical latency, cost, and relaxed peak-to-average power ratio (PAPR). Behavior of NLOS backhaul links at small cell sites also differs from RAN in that there is no handover, remote units do not connect and disconnect at the same rate as user equipment (UE) and the NLOS remote unit (RU) and small cell site is not mobile. Moreover, typical NLOS backhaul systems do not support Hybrid Automatic Repeat Request (HARQ) transmissions to confirm reception of UL and DL transmissions.

While preceding approaches provide improvements in backhaul transmission in a wireless NLOS environment, the present inventors recognize that still further improvements are possible. Accordingly, the preferred embodiments described below are directed toward this as well as improving upon the prior art.

BRIEF SUMMARY OF THE INVENTION

In a first embodiment of the present invention, there is disclosed a method of operating a wireless communication system. The method includes receiving N respective downlink transmissions at a second transceiver from a first transceiver, where N is a positive integer greater than 1. Reception acknowledgement signals (ACK/NACKs) for the N downlink transmissions are combined into a single reception acknowledgement signal. The single reception acknowledgement signal is transmitted to the first transceiver. The first transceiver configures N independently for each of a plurality of transceivers including the second transceiver.

In a second embodiment of the present invention, there is disclosed a method of operating a wireless communication system. The method includes receiving respective uplink transmissions at a first transceiver from M second transceivers, where M is a positive integer greater than 1. Reception acknowledgement signals (ACK/NACKs) for the M second transceivers are combined into a single reception acknowledgement signal. The single reception acknowledgement signal is transmitted to each of the M second transceivers.

In a third embodiment of the present invention, there is disclosed a method of operating a wireless communication system. The method includes transmitting control information from a first transceiver to a second transceiver indicating parameters for one of an uplink (UL) and downlink (DL) transmission. A preempt signal is transmitted with the control information to indicate whether a first transmission is preempted by one of an uplink (UL) and downlink (DL) transmission.

BRIEF DESCRIPTION OF THE SEVERAL VIEWS OF THE DRAWING

FIG. 2 is a diagram of downlink and uplink subframe configurations according to the present invention;

FIG. 3 is a diagram of a subset of downlink and uplink subframe configurations of the prior art;

FIG. 4 is a diagram of a subset of downlink and uplink slot configurations according to the present invention;

FIG. 8A is a diagram showing RU allocation for frame configuration 6 of FIG. 2;

DETAILED DESCRIPTION OF THE INVENTION

Some of the following abbreviations are used throughout the instant specification. The following glossary provides an alphabetical explanation of these abbreviations.

Figure 1:
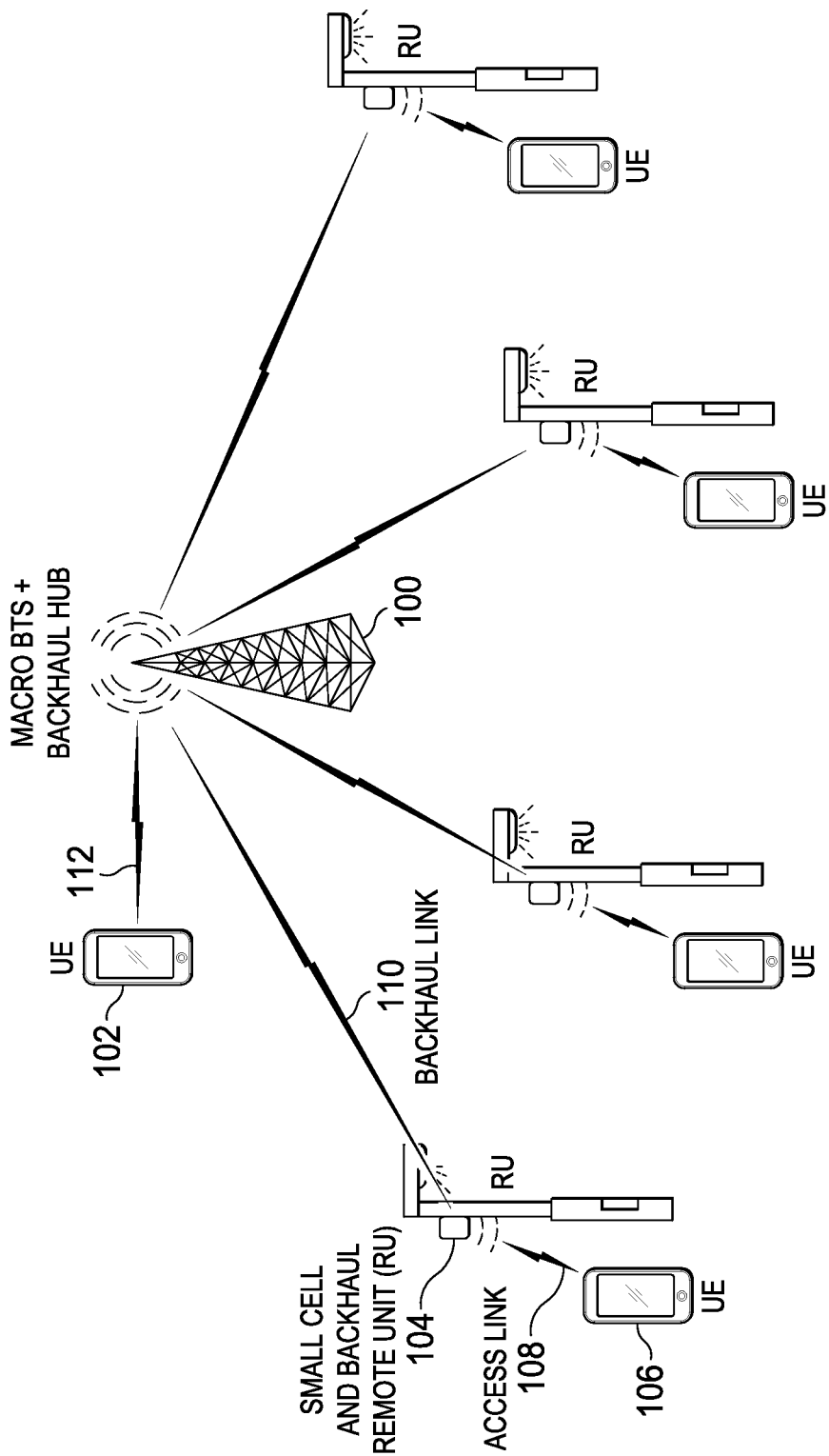
FIG. 1 is a diagram of a wireless communication system with a cellular macro site hosting a backhaul point to multipoint (P2MP) hub unit (HU) serving plural remote units (RUs) which relay communications between small cells and plural user equipment (UE)

BLER: Block Error Rate
CQI: Channel Quality Indicator
CRS: Cell-specific Reference Signal
CSI: Channel State Information
CSI-RS: Channel State Information Reference Signal
DCI: Downlink Control Information
DL: DownLink
DwPTS: Downlink Pilot Time Slot
eNB: E-UTRAN Node B or base station or evolved Node B
EPDCCH: Enhanced Physical Downlink Control Channel
E-UTRAN: Evolved Universal Terrestrial Radio Access Network
FDD: Frequency Division Duplex
HARQ: Hybrid Automatic Repeat Request
HU: (backhaul) Hub Unit
ICIC: Inter-cell Interference Coordination
LTE: Long Term Evolution
MAC: Medium Access Control
MIMO: Multiple-Input Multiple-Output
MCS: Modulation Control Scheme
OFDMA: Orthogonal Frequency Division Multiple Access
PCFICH: Physical Control Format Indicator Channel
PAPR: Peak-to-Average Power Ratio
PDCCH: Physical Downlink Control Channel
PDSCH: Physical Downlink Shared Channel
PMI: Precoding Matrix Indicator
PRB: Physical Resource Block
PRACH: Physical Random Access Channel
PS: Pilot Signal
PUCCH: Physical Uplink Control Channel
PUSCH: Physical Uplink Shared Channel
QAM: Quadrature Amplitude Modulation
RAR: Random Access Response
RE: Resource Element
RI: Rank Indicator
RRC: Radio Resource Control
RU: (backhaul) Remote Unit
SC-FDMA: Single Carrier Frequency Division Multiple Access
SPS: Semi-Persistent Scheduling
SRS: Sounding Reference Signal
TB: Transport Block
TDD: Time Division Duplex
TTI: Transmit Time Interval
UCI: Uplink Control Information
UE: User Equipment
UL: UpLink
UpPTS: Uplink Pilot Time Slot Referring to FIG. 1, there is a NLOS Time Division Duplex (TDD) wireless backhaul system according to the present invention. Cellular macro site 100 hosts a macro base station. Macro site 100 also hosts a wireless backhaul hub unit (HU). Macro site 100 is connected with small cell sites such as small cell site 104. Each small cell site is co-located with a small cell base station and wireless backhaul remote unit (RU). Macro site 100 communicates with the small cell sites through a point-to-multipoint (P2MP) wireless backhaul system via backhaul links such as backhaul link 110. The base station of macro site 100 communicates directly with UE 102 over RAN link 112. UE 106, however, communicates directly with the small cell base station of small cell site 104 over a RAN access link 108. The RU of small cell site 104, in turn, communicates directly with the HU of macro cell site 100 over a backhaul link 110. The system is designed to maximize spectrum reuse. The backhaul link 110 design utilizes a 0.5 ms slot-based transmission time interval (TTI) to minimize latency and 5 ms UL and DL frames for compatibility with TD-LTE. Thus, various UL/DL ratios are compatible with TD-LTE configurations. This allows flexible slot assignment for multiple Remote Units (RUs).

FIG. 2 shows the TDD frame structure of the present invention, with seven uplink (UL) and downlink (DL) frame configurations, thus supporting a diverse mix of UL and DL traffic ratios. Each configuration includes various uplink (U), downlink (D), and special (S) slots, each having a 0.5 ms duration transmit time interval (TTI) for a total frame duration of 5 ms. In one embodiment, this frame structure is utilized to generate an NLOS backhaul link 110 of FIG. 1. However, the present invention may be used to generate any kind of communication link sharing similar co-existence with TD-LTE and performance requirements as the NLOS backhaul link. As a result, without loss of generality the frame structure and associated components (slots, channels, etc. . . . ) of the present invention are referred to as "NLOS backhaul" or simply "NLOS" frame, slots, channels, etc.

Referring now to FIG. 3, the frame structure of a 10 ms TD-LTE frame of the prior art will be compared to a 5 ms TDD frame (FIG. 4) of the present invention. FIG. 4 is a more detailed view of UL/DL frame configurations 1, 3 and 5 as shown at FIG. 2. The frame of FIG. 3 is divided into ten subframes, each subframe having a 1 ms TTI. Each subframe is further divided into two slots, each slot having a 0.5 ms duration. Thus, there are twenty slots (0-19) in each TD-LTE configuration. A D in a slot indicates it is a downlink slot. Correspondingly, a U in a slot indicates it is an uplink slot. Time slots 2 and 3 constitute a special subframe allowing transitioning from a DL subframe to an UL subframe. DwPTS and UpPTS indicate downlink and uplink portions of the special subframe, respectively.

By way of comparison, the frame of FIG. 4 of the present invention has a 5 ms duration and is slot based rather than subframe based. Each frame has ten (0-9) slots. Each slot has a 0.5 ms duration. As with the frame of FIG. 3, D indicates a downlink slot, and U indicates an uplink slot. In each of the three UL/DL configurations of FIG. 4, however, slots 3 of both frames include a special slot indicated by an S, rather than the special subframes in slots 2-3 and 12-13 of FIG. 3. This fixed location of the special slot assures compatibility with TD-LTE frames. It advantageously permits always finding an NLOS UL/DL configuration that is 100% compatible with any 5 ms period TD-LTE UL/DL subframe configuration. For example, this prevents an NLOS backhaul DL transmission from interfering with a TD-LTE RAN UL transmission on an access link when both operate on the same frequency. In other words, it advantageously prevents the transmitter at macro cell site 100 of one system from interfering with the receiver of a co-located system.

The frame configurations of FIG. 4 have several features in common with the frame configurations of FIG. 3 to assure compatibility when operating at the same frequency. Both frames have 0.5 ms slot duration with seven SC-FDMA symbols and a normal cyclic prefix (CP) in each slot. The SC-FDMA symbol duration is the same in each frame. Both frames have the same number of subcarriers for respective 5 MHz, 10 MHz, 15 MHz, and 20 MHz bandwidths, and both have 15 kHz subcarrier spacing. Both frames use the same resource element (RE) definition and support 4, 16, and 64 QAM encoding.

The frame configuration of FIG. 4 has several unique features. The symbols of each slot are primarily SC-FDMA for both UL and DL. The first SC-FDMA symbol of each slot includes a pilot signal (PS) to improve system latency. A cell-specific sync signal (SS) different from the PS is included in each frame for cell search and frame boundary detection.

Figure 5:
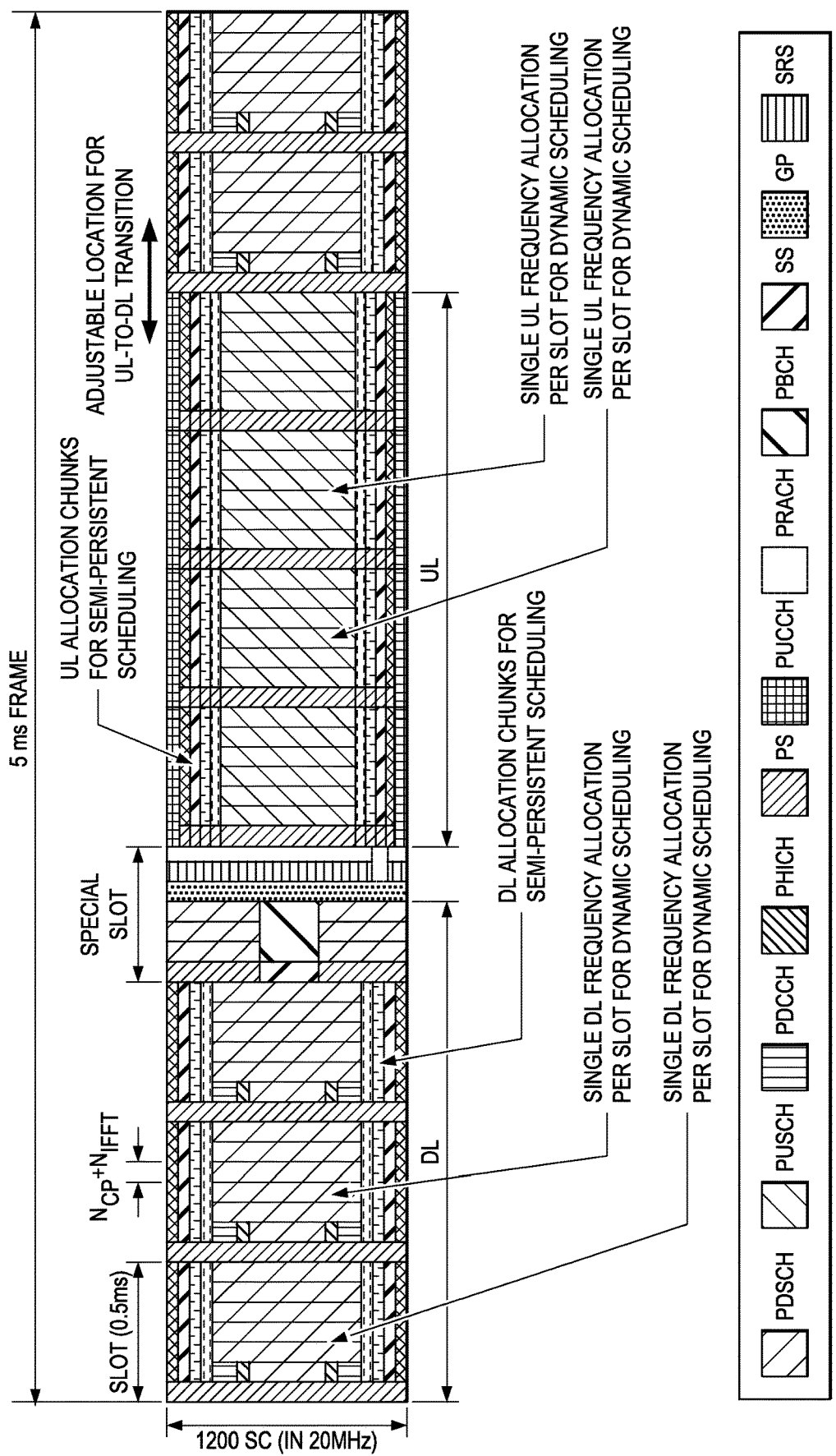
FIG. 5 is a detailed diagram of a data frame as in configuration 3 (FIG. 2) showing downlink and uplink slots and a special slot.

Referring now to FIG. 5, there is a detailed diagram of an NLOS backhaul (BH) frame as shown in UL/DL configuration 3 of FIG. 4. Here and in the following discussion, the vertical axis of the diagram indicates frequencies of component carriers, and the horizontal axis indicates time, where each slot has 0.5 ms duration. For example, a slot having a 20 MHz bandwidth includes 1200 subcarriers (SC) having a carrier spacing of 15 kHz. The frame includes DL slots, a special slot, and UL slots. Each DL and UL slot has seven respective single carrier frequency division multiple access (SC-FDMA) symbols. Each symbol is indicated by a separate vertical column of the slot.

Figure 6:
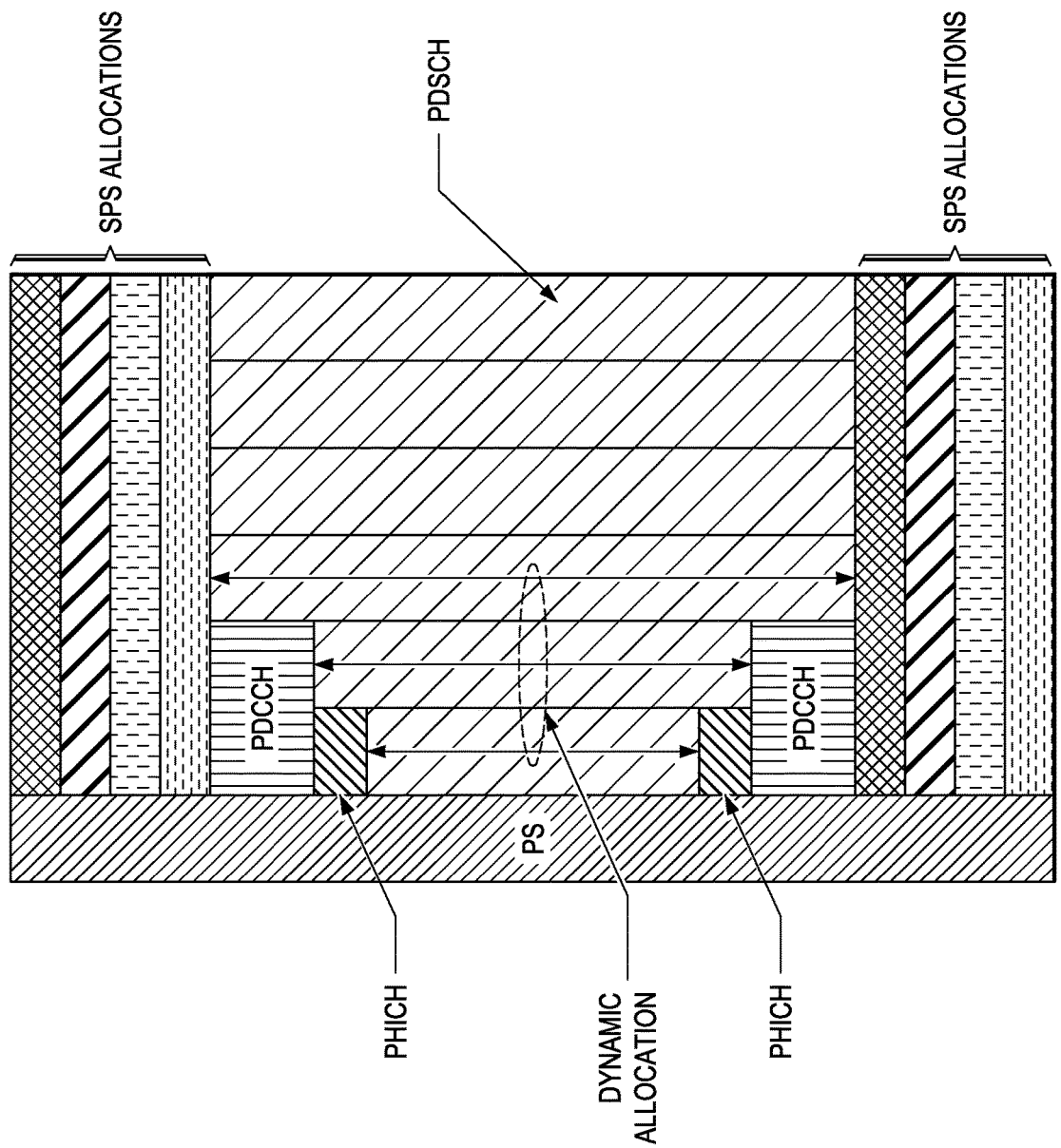
FIG. 6 is a diagram of a downlink (DL) slot that may be used in the data frame of FIG. 5 according to the present invention.

Referring to FIG. 6, there is a detailed diagram of a downlink slot that may be used with the frame of FIG. 5. DL slots are used for transmitting the Physical Downlink Shared Channel (PDSCH) conveying payload traffic from the HU to the RUs. The DL slot includes dynamic and semi-persistent scheduling (SPS) regions as directed by Medium Access Control (MAC) signaling. Dynamic scheduling allocates resources based on UE feedback about the link condition. This achieves flexible resource allocation at the cost of increased control signaling that may hinder packet delivery. Semi-persistent scheduling allocates packets for a fixed future time. This advantageously provides flexible resource allocation with fewer control signals. With the exception of special slots, the DL slot also contains the Physical HARQ Indicator Channel (PHICH) conveying HARQ ACK/NACK feedback to the RU. The Physical Downlink Control Channel (PDCCH) is also transmitted in this slot. The PDCCH provides the RU with PHY control information for MCS and MIMO configuration for each dynamically scheduled RU in that slot. The PDCCH also provides the RU with PHY control information for MCS and MIMO configuration for each dynamically scheduled RU in one or more future UL slots.

In order to improve the latency for high priority packets, four pairs of spectrum allocations at both ends of the system bandwidth may be assigned to different RUs, where the frequency gap between the two allocation chunks of a pair is the same across allocation pairs. The resource allocation is done in a semi-persistent scheduling (SPS) approach through a dedicated message from higher layers in the PDSCH channel. The size of each SPS allocation pair is configurable depending on expected traffic load pattern. For example, no physical resource blocks (PRBs) are allocated for SPS transmission when there is no SPS allocation. With greater expected traffic, either two (one on each side of the spectrum) or four (two on each side of the spectrum) PRBs may be allocated. Each RU may have any SPS allocation or multiple adjacent SPS allocations. In one embodiment, all four SPS allocation pairs are the same size. Most remaining frequency-time resources in the slot, except for PS, PDCCH, PHICH, and SPS allocations, are preferably dynamically assigned to a single RU whose scheduling information is conveyed in the PBCH.

Similar to LTE, in order to minimize the complexity, all allocation sizes are multiples of PRBs (12 subcarriers) and are restricted to a defined size set. The only exception is for SPS allocations that may take the closest number of subcarriers to the nominal targeted allocation size (2 or 4 PRBs). This minimizes the wasted guard bands between SPS and the PDSCH or PUSCH.

A special slot structure is disclosed which includes a Sync Signal (SS), Physical Broadcast Channel (PBCH), Pilot Signals (PS), Guard Period (GP), and Physical Random Access Channel (PRACH) as will be described in detail. These slot-based features greatly simplify the LTE frame structure, reduce cost, and maintain compatibility with TD-LTE. The present invention advantageously employs a robust Forward Error Correction (FEC) method by concatenating turbo code as an inner code with a Reed Solomon outer block code providing a very low Block Error Rate (BLER). Moreover, embodiments of the present invention support carrier aggregation with up to four Component Carriers (CCs) per HU with dynamic scheduling of multiple RUs with one dynamic allocation per CC. These embodiments also support semi-persistent scheduling (SPS) of small allocations in Frequency Division Multiple Access (FDMA) within a slot for RUs destined to convey high priority traffic, thereby avoiding latency associated with Time Division Multiple Access (TDMA) of dynamic scheduling. This combination of TDMA dynamic scheduling and FDMA SPS provides optimum performance with minimal complexity.

There are several advantages to this type of dynamic allocation. Each RU receives the allocation information from the parent HU on the physical broadcast channel (PBCH). Each RU decodes this allocation information every 5 ms to find its potential slot(s) and component carrier(s). In this manner, every RU is aware of the dynamic slot allocation for every other RU served by the HU. Each RU then obtains procedural information on a physical downlink control channel (PDCCH) identified with the respective slot. In other words, the PDCCH provides procedural information such as modulation control scheme (MCS), precoding matrix indicator (PMI), and Rank Indicator (RI) without regard to which RU is the intended recipient of that slot. The benefit of this is that the PDCCH may be distributed to all DL slots and component carriers with a minimal size. Each PDCCH does not need to carry an index of the RU scheduled in its associated slot. Moreover, since all RU indices and component carriers are identified by the PBCH, receipt of all allocation information may be acknowledged by each RU with a single PBCH-ACK.

Figure 7:
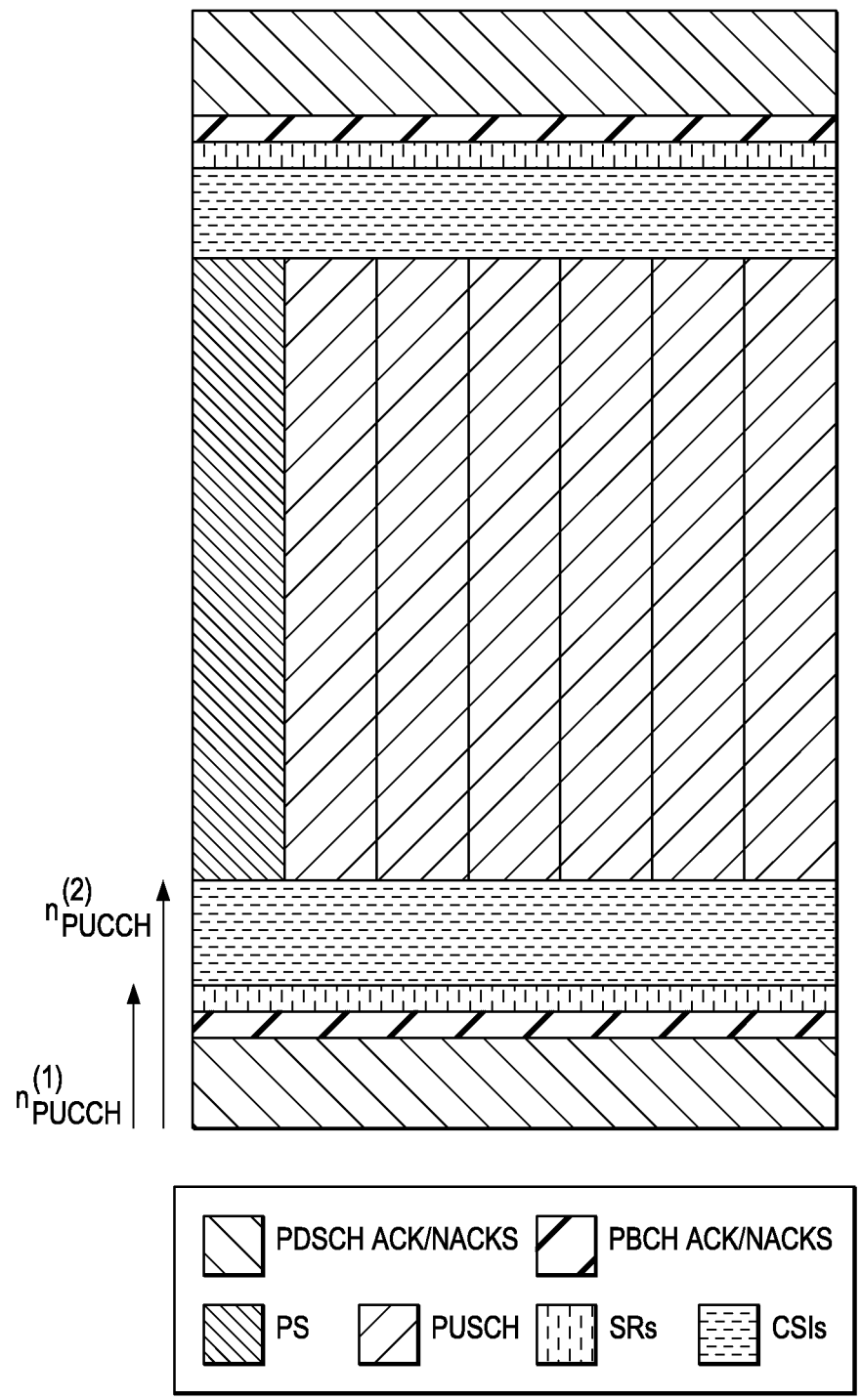
FIG. 7 is a diagram of an uplink (UL) slot that may be used in the data frame of FIG. 5 according to the present invention.

In FIG. 7 there is a detailed diagram of the uplink skit that may be used with the frame of FIG. 5. UL slots are used for transmitting the Physical Uplink Shared Channel (PUSCH) conveying payload traffic to the HU from the RUs. The PUSCH region in FIG. 7 includes both dynamic and semi-persistent scheduling (SPS) allocations, where the latter are located at both spectrum edges of the PUSCH region as shown in FIG. 5. The PUCCH provides the HU with HARQ ACK/NACK feedback from the RU, ACK/NACK bundling is needed in some configurations, and bundling must apply per RU. A direct consequence is that ACK/NACK mapping onto PUCCH resources group ACK/NACKs on a per RU basis. This assumes each RU is aware of all DL allocations of other RUs. For dynamic allocations, this is straightforward since each RU decodes all dynamic grants in the PBCH. For SPS allocations, this implies higher layers signal SPS allocations of all RUs to each RU. In case of ACK/NACK bundling, each RU is aware of the potential bundling factor applied to all other RUs, so each RU is aware of the total number $N_{RU}^{A/N}(n_{RU})$ of PDSCH ACK/NACKs (bundled or not) reported by any given RU with RU index $N_{RU}$. For each RU, the PDSCH ACK/NACKs to be transmitted in a PUCCH slot are first grouped in the time direction across multiple DL slots associated with the UL slot in chronological order. Then they are grouped in the frequency direction across secondary component carriers (CCs) first by decreasing CC index and then by primary CC last. In the primary CC they are grouped first across the dynamic allocation and then the SPS allocation. With dynamic scheduling, the RU decodes the PBCH every 5 ms to find its potential slot allocation information. Transmission over the PUSCH or reception over the PDSCH may be dynamically or semi-persistently scheduled (SPS) by the HU Both PUSCH transmission and PDSCH reception are configured independently for each RU through higher layer signaling on the PDSCH. RUs with good channel characteristics may be configured with larger bundling factors than RUs with poor channel characteristics. The SPS configuration includes frequency chunk(s) among four available SPS chunks per slot as well as a number of adjacent chunks used by a RU. Additional configuration information includes time slot(s) in each frame, period of the SPS allocation, modulation control scheme (MCS), transmission mode (TM), and SPS chunk size for DL.

PUCCH allocation size is mainly driven by PDSCH ACK/NACK allocation. For a given bandwidth, only a fixed number of physical resource blocks (PRBs) are available for PUCCH and PUSCH transmission. According to an embodiment of the present invention, a number of PUCCH PRBs is completely determined from the UL/DL frame configuration, the slot number, and the number of RUs supported by the HU. As a result, the PUCCH allocation size does not need to be explicitly signaled to the RUs. Each RU determines the PUCCH allocation size for each slot from the frame configuration and the total number of RUs.

By way of example, FIG. 8A is a diagram showing DL slot allocation for RUs (0-4) for frame configuration 6 of FIG. 2. The diagram is organized by row according to frequency with the lower five rows for primary component carrier (0) and the upper three rows (1-3) for secondary component carriers. The component carriers are identified as dynamic or SPS allocations in the second column. Each of the dynamic or SPS allocations is further identified with a corresponding transmission number in the third column. The fourth through twelfth columns are time slots 1-0 of the frame. For example, the first row indicates DL slot 1 is a dynamic allocation of component carrier 3 for RU 1. DL slot 2 is a dynamic allocation of component carrier 3 for RU 2. DL slot 3 is a dynamic allocation of component carrier 3 for RU 3. Slot 4 is an UL slot and is, therefore, blank. DL slots 5-6 are a dynamic allocations of component carrier 3 for RUs 4 and 0, respectively.

Figure 8B:
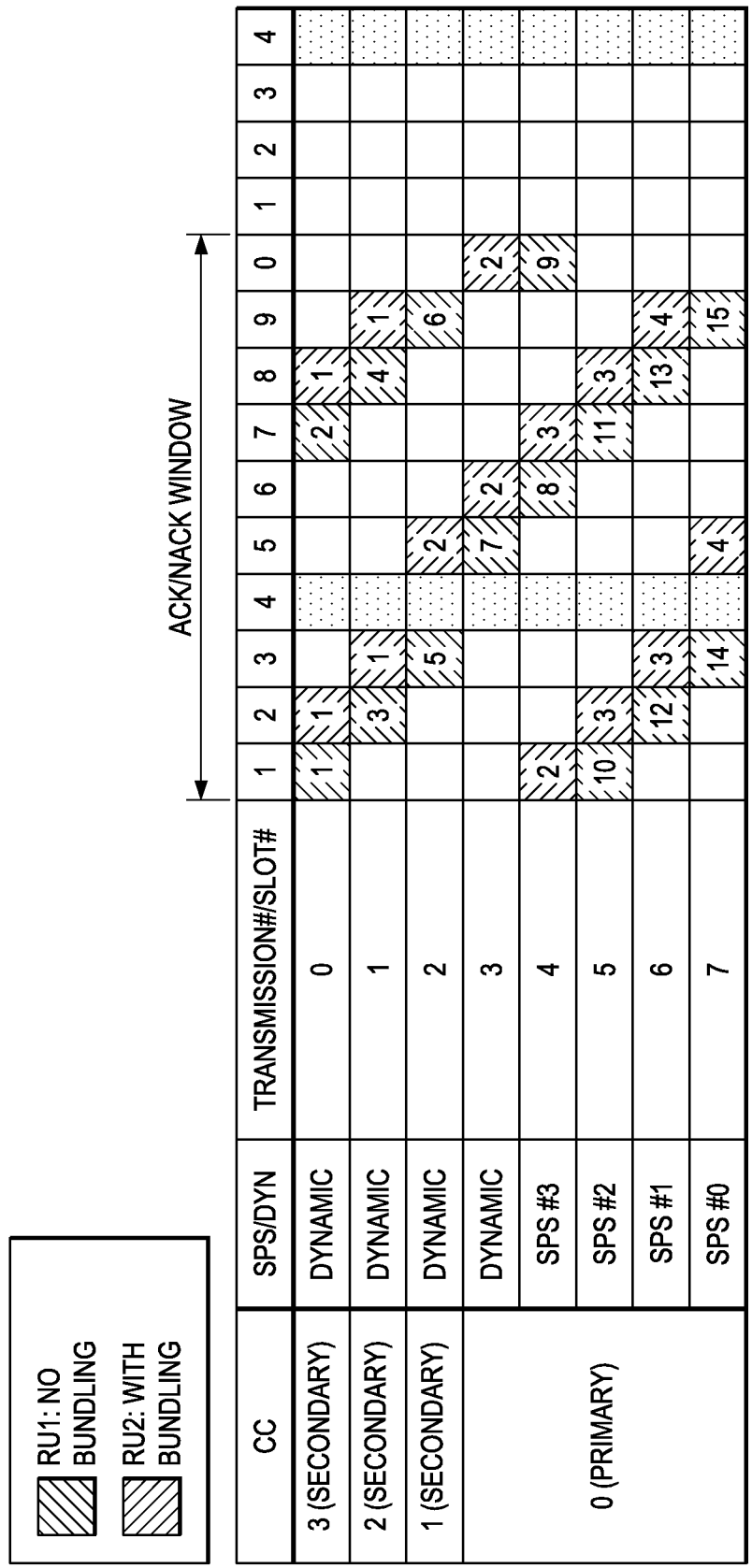
FIG. 8B is a diagram showing ACK/NACK remote unit (RU) bundling transmitted in the PUCCH for the allocation of FIG. 8A.

FIG. 8B is a diagram showing the ordering $N_{RU}^{A/N}(n_{RU})$ of PDSCH ACK/NACKs of PDSCH transmissions of RU, with RU index $n_{RU}$ reported in UL slot #4 for RU#1, where $n_{RU}=1$ (without bundling) and RU#2, where $n_{RU}=2$ (with bundling) from the use case defined in FIG. 8A. For example, DL slots 1 and 7 of the first row (secondary CC#3) were allocated to RU 1, and their corresponding PUCCH indexes $n_{RU}^{A/N}(n_{RU}=2)$ are all 1, since there is no bundling. Thus, the ACK/NACK transmitted in response to DL slot 1 of the first row represents reception only in that slot. DL slots 2 and 8 of the first row (secondary CC#3) and 3 and 9 of the second row (secondary CC#2) were allocated to RU 2, and their corresponding PUCCH ACK/NACK indexes $n_{RI}^{A/N}(n_{RU}=2)$ are all 1, since there is bundling with a bundling factor of 4. This means that if either slot 2 or 8 on secondary CC#3 or slot 3 or 9 on secondary CC#2 fail to receive a transmission, therefore, a single negative acknowledgement (NACK) signal is bundled and transmitted. An acknowledgement (ACK) signal is transmitted only if all of slots 2 and 8 on secondary CC#3 and slots 3 and 9 on secondary CC#2 receive correct transmissions.

PUCCH allocation size is mainly driven by PDSCH ACK/NACKs. PUCCH physical resource blocks (PRBs) are fully determined from the UL/DL frame configuration, slot number, and maximum number of supported RUs. As a result, the PUCCH allocation size does not need to be explicitly signaled to the RUs. Furthermore, ACK/NACK bundling is only required where there is a large difference between UL and DL slots in a frame as in configuration 6 (FIG. 2). The ACK/NACK window of FIG. 8B indicates a range of slots in a frame where HARQ feedback signals may be bundled. The window spans both time and component carrier (CC) frequency. The size of the window depends on the TDD UL/DL configuration and UL slot number in the TDD frame. The bundling factor within the window is the number of RU feedback acknowledgement signals that are combined and transmitted to the HU in a subsequent UL frame. This bundling factor is signaled to the RU in the PBCH within the window. In particular, the bundling factor in the PBCH defines the number of consecutive bundled transmissions in an ACK/NACK report.

On the reverse side, UL transmissions from RUs to the HU are also HARQ acknowledged by the HU. This is referred to as UL HARQ ACK/NACK and the ACK/NACK reports are sent in downlink on the Physical HARQ Indicator Channel (PHICH). Here as well, ACK/NACK bundling, will be needed in some configurations. ACK/NACK bundling of n transport blocks (TBs) into one ACK/NACK report comprises transmitting ACK if all bundled TBs were correctly decoded (CRC check passed) and NACK if at least one of the TBs had an incorrect CRC.

When bundling 4 slots into 3, the first two UL slots (in chronological order) are bundled together, the following two UL slots are not bundled. Note slot bundling may bundle ACK/NACKs of different RUs if different RUs were scheduled in the two slots. Slot bundling applies between FDMA allocations of same FDMA index $n_{FDMA}^{UL}$.

Figure 9:
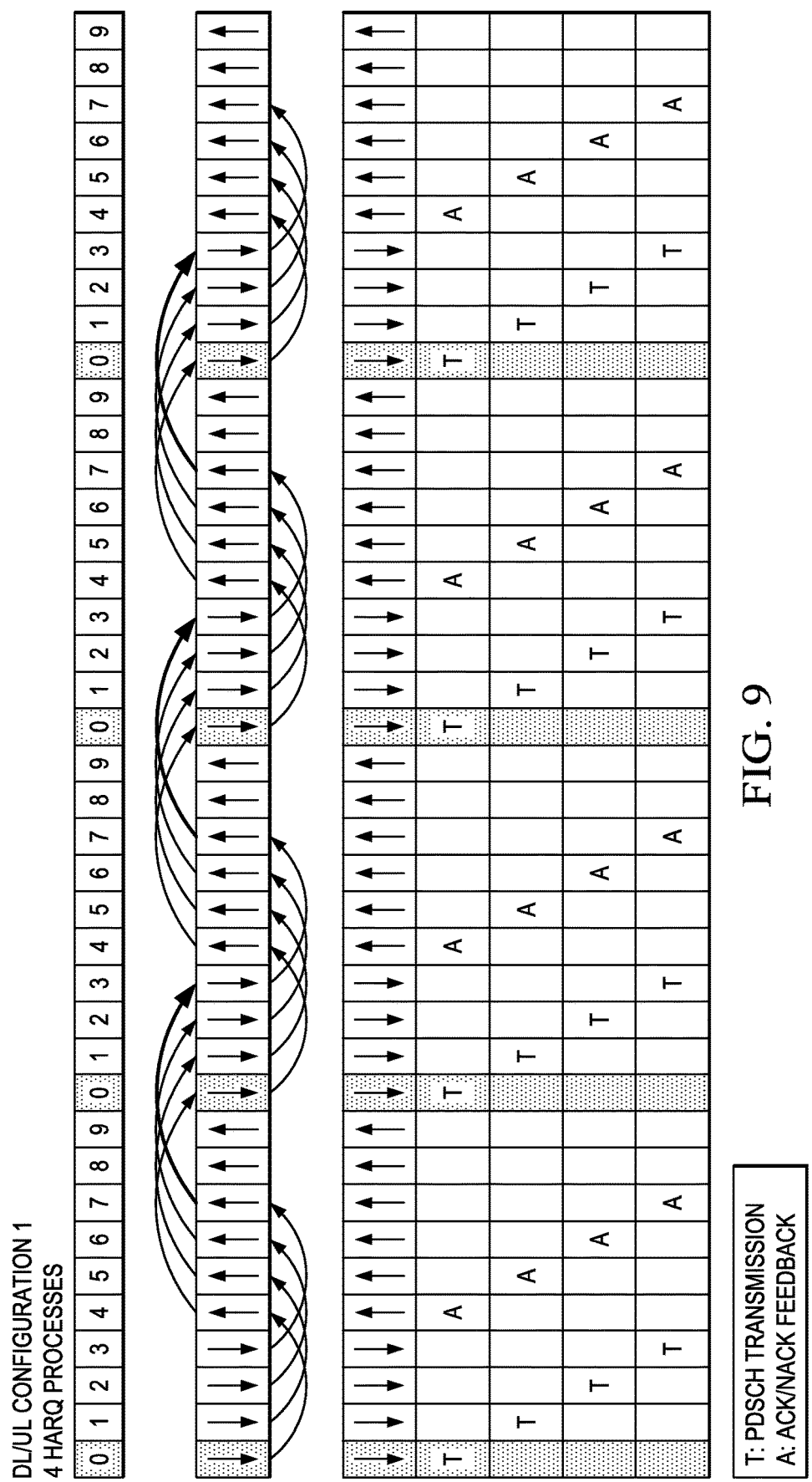
FIG. 9 is a diagram showing non-adaptive retransmissions having different allocation sizes through rate matching.

Referring to FIG. 9, there is a diagram showing non-adaptive retransmissions having different allocation sizes through rate matching. For example, a HARQ retransmission may have a different allocation size than the initial transmission. Thus, it is rate matched to the new allocation size and adjusted to the total number of bits available for transmission in one transport block of the new allocation. For UL and DL HARQ, the PDCCH tells in an allocation grant if an UL or DL resource is preempted or replaced by another RU. Preemption is signaled by a DCI bit associated with the retransmission. The preempt bit is set to signal the format of the retransmission even if the preempting RU is the same as the preempted RU according to the following rules. When no RU is scheduled in a dynamic or SPS allocation, the associated preempt bit is reset. When no RU is scheduled in a dynamic allocation, the associated DCI in the PDCCH is all zero (blank). When an RU is scheduled in a dynamic allocation but reports a PBCH NACK, the associated DCI in the PDCCH is all zero (blank) except for the preempt bit which is set.

Embodiments of the present invention are directed to synchronous Hybrid Automatic Repeat Request (HARQ) design for NLOS backhaul. For each UL/DL configuration, there is a specific timing and associated number of processes. For example, the diagram of FIG. 9 is for UL/DL configuration 1 (FIG. 2). Slot numbers 0-9 at the top show four sequential frames and four corresponding HARQ processes. Frame boundaries at each slot 0 are shaded. In the middle row of vertical arrows, a down arrow indicates a DL slot and an up arrow indicates an UL slot. Lower curved arrows extend from a DL slot to an UL slot that contains a corresponding ACK/NACK. Upper curved arrows extend from the UL slot containing the ACK/NACK to a subsequent DL slot that will include a retransmission in the event of a NACK. The lower four rows represent four respective HARQ processes which can be used by the same or different RUs. Each T indicates a DL transmission on the PDSCH for the HARQ process in that row. Correspondingly, each A represents an ACK/NACK on the PUCCH for the HARQ process in that row.

There are several significant advantages to the foregoing embodiments of the present invention. First, the HARQ is synchronous and non-adaptive. A NACK implicitly dictates a retransmission in the next available slot for that process. Second, even though the retransmission is non-adaptive, it may have a different allocation size than the original transmission. Third, the different allocation size is rate matched to accommodate the different allocation size. Fourth, the PDCCH tells in the allocation grant if an UL or DL resource is preempted by another RU. Finally, latency requirements are greatly reduced with respect to LTE. HU processing for PUSCH reception and PHICH transmission requires three slots or 1.5 ms. This is half that of LTE. HU processing for PUCCH reception and PDSCH transmission requires two slots or 1.0 ms. This is one third that of LTE. RU processing for PHICH reception and PUSCH transmission requires two slots or 1.0 ms. This is one third that of LTE. RU processing for PDSCH reception and PUCCH transmission requires three slots or 1.5 ms. This is half that of LTE.

Still further, while numerous examples have thus been provided, one skilled in the art should recognize that various modifications, substitutions, or alterations may be made to the described embodiments while still falling with the inventive scope as defined by the following claims. Furthermore, embodiments of the present invention may be implemented in software, hardware, or a combination of both. Other combinations will be readily apparent to one of ordinary skill in the art having access to the instant specification.

What is claimed is:

1. A method of operating a wireless communication system, the method comprising:
   receiving, at a second transceiver from a first transceiver, in a physical broadcast channel (PBCH), a number (N) indicative of a bundling factor for acknowledgement/negative acknowledgement (ACK/NACK) transmission, wherein N is a positive integer greater than 1;
   receiving N downlink transmissions at the second transceiver from the first transceiver;
   combining reception acknowledgement signals for the N downlink transmissions into a single reception acknowledgement signal in order of sequential time slots and component carrier frequencies; and
   transmitting the single reception acknowledgement signal from the second transceiver to the first transceiver.

2. The method of claim 1, wherein first transceiver is a hub unit (HU) of a wireless backhaul system, and wherein the second transceiver is a remote unit (RU) of the wireless backhaul system.

3. The method of claim 1, wherein N is configured in response to a channel quality between the first transceiver and the second transceiver.

4. The method of claim 1, wherein the downlink transmissions are received on a Physical Downlink Shared Channel (PDSCH), and wherein the single reception acknowledgement signal is transmitted on a Physical Uplink Control Channel (PUCCH).

5. The method of claim 1, wherein the single reception acknowledgement signal is an acknowledgement (ACK) when all N downlink transmissions are correctly received at the second transceiver, and wherein the single reception acknowledgement signal is a negative acknowledgement (NACK) when at least one of the N downlink transmissions is incorrectly received at the second transceiver.

6. The method of claim 1, comprising:
   receiving at the second transceiver a downlink transmission having a first allocation size; and
   receiving at the second transceiver a retransmission of the downlink transmission having a second allocation size.

7. The method of claim 6, comprising rate matching the retransmission to the second allocation size.

8. The method of claim 1, wherein the downlink transmissions occur within a feedback window determined by a time division duplex (TDD) downlink/uplink frame configuration and uplink slot number of the TDD frame.

9. The method of claim 8, wherein N is signaled to the second transceiver in the Physical Broadcast Channel (PBCH) within the feedback window.

10. The method of claim 8, wherein the feedback window spans a plurality of time slots of a frame and a plurality of component carrier frequencies.

11. A wireless communication apparatus, comprising:
    circuitry for receiving, at a second transceiver from a first transceiver, in a physical broadcast channel (PBCH), a number (N) indicative of a bundling factor for acknowledgement/negative acknowledgement (ACK/NACK) transmission, wherein N is a positive integer greater than 1;
    circuitry for receiving N downlink transmissions at the second transceiver from the first transceiver;
    circuitry for combining reception acknowledgement signals for the N downlink transmissions into a single reception acknowledgement signal in order of sequential time slots and component carrier frequencies; and
    circuitry for transmitting the single reception acknowledgement signal by the second transceiver to the first transceiver.

12. The apparatus of claim 11, wherein first transceiver is a hub unit (HU) of a wireless backhaul system, and wherein the second transceiver is a remote unit (RU) of the wireless backhaul system.

13. The apparatus of claim 11, wherein N is configured in response to a channel quality between the first transceiver and the second transceiver.

14. The apparatus of claim 11, wherein the downlink transmissions are received on a Physical Downlink Shared Channel (PDSCH), and wherein the single reception acknowledgement signal is transmitted on a Physical Uplink Control Channel (PUCCH).

15. The apparatus of claim 11, wherein the single reception acknowledgement signal is an acknowledgement (ACK) when all N downlink transmissions are correctly received at the second transceiver, and wherein the single reception acknowledgement signal is a negative acknowledgement (NACK) when at least one of the N downlink transmissions is incorrectly received at the second transceiver.

16. The apparatus of claim 11, comprising:
circuitry for receiving at the second transceiver a downlink transmission having a first allocation size; and
circuitry for receiving at the second transceiver a retransmission of the downlink transmission having a second allocation size.

17. The apparatus of claim 16, comprising circuitry for rate matching the retransmission to the second allocation size.

18. The apparatus of claim 11, wherein the downlink transmissions occur within a feedback window determined by a time division duplex (TDD) downlink/uplink frame configuration and uplink slot number of the TDD frame.

19. The apparatus of claim 18, wherein N is signaled to the second transceiver in the Physical Broadcast Channel (PBCH) within the feedback window.

20. The apparatus of claim 18, wherein the feedback window spans a plurality of time slots of a frame and a plurality of component carrier frequencies.

* * * * *